Figure 1:
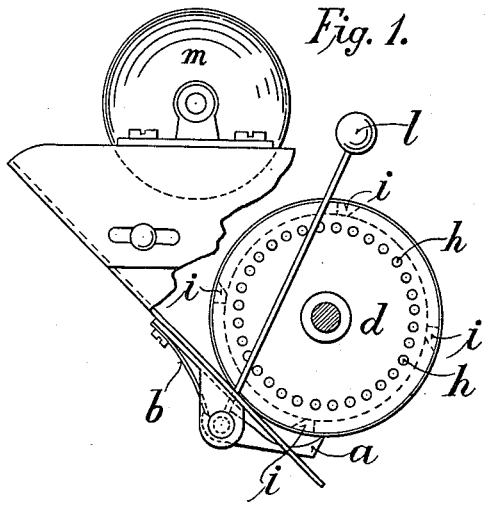

No. 825,899. PATENTED JULY 17, 1906.
J. F. FORKARTH.
TYPE WRITING MACHINE.
APPLICATION FILED JULY 1, 1904.

3 SHEETS—SHEET 1.

Witnesses:
L. Warnken
E. Bringe

Inventor:
Josef Franz Forkarth
by Henry Schmidt
Attorney.

No. 825,899. PATENTED JULY 17, 1906.
J. F. FORKARTH.
TYPE WRITING MACHINE.
APPLICATION FILED JULY 1, 1904.
3 SHEETS—SHEET 2.
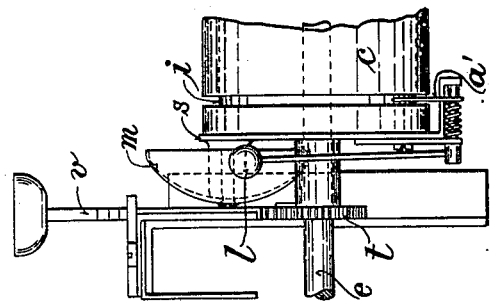
Fig. 9.
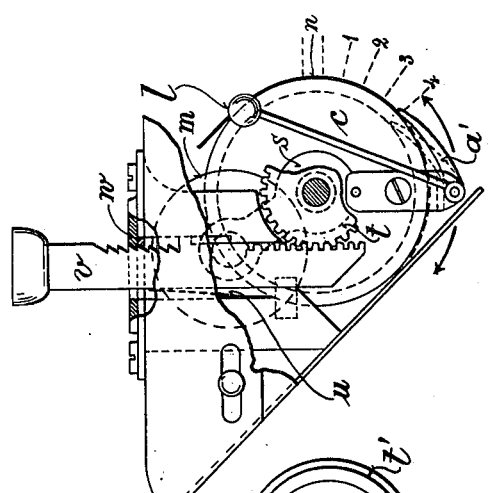
Fig. 8.
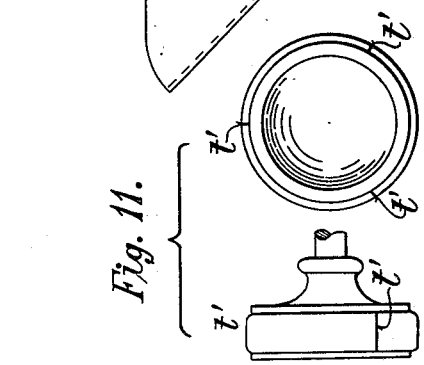
Fig. 11.
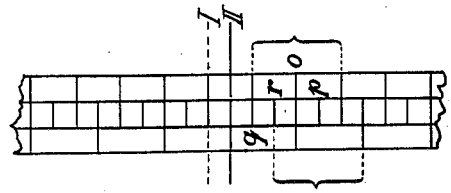
Fig. 10.
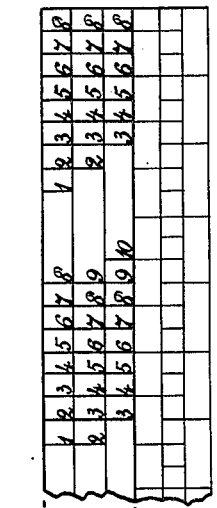
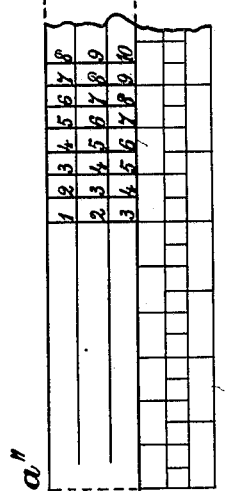
Fig. 12.
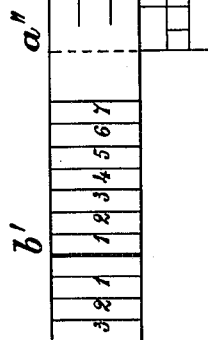
Witnesses:
L. Warnken.
E. Bringe.
Inventor:
Josef Franz Forkarth
by Henry E. Schmidt
Attorney.

No. 825,899. PATENTED JULY 17, 1906.
J. F. FORKARTH.
TYPE WRITING MACHINE.
APPLICATION FILED JULY 1, 1904.

3 SHEETS—SHEET 3.

Witnesses:
L. Waruren
E. Bringe.

Inventor:
Josef Franz Forkarth
by
Attorney.

UNITED STATES PATENT OFFICE.

JOSEF FRANZ FORKARTH, OF INNSBRUCK-WILTEN, AUSTRIA-HUNGARY.

TYPE-WRITING MACHINE.

No. 825,899.　　　　Specification of Letters Patent.　　　Patented July 17, 1906.

Application filed July 1, 1904. Serial No. 214,966.

*To all whom it may concern:*

Be it known that I, JOSEF FRANZ FOR-KARTH, a citizen of the Empire of Austria-Hungary, and a resident of Innsbruck-Wil-ten, in the Empire of Austria-Hungary, (whose post-office address there is No. 9 Haspingerstrasse,) have invented a certain new and useful Improvement in Type-Writing Machines, of which the following is a specification.

My invention relates to type-writing machines; and its object is to provide means for enabling the operator to so adjust the sheet of paper before starting to write thereon that the lower margin below the last line to be written on the sheet may be given any desired width measurable by single-line spaces and that upon the last line having been written on the sheet a single or a locking or releasing mechanism will be caused to operate, thereby either warning the writer that he must cease writing or automatically rendering the machine inoperative for the time being.

I am aware that certain mechanisms have already been devised for a similar object wherein a pawl either rigidly or adjustably mounted in the type-writing machine was held in such a position by the sheet of paper passing over the impression-roller that the said mechanism could not in any way interfere with the manipulation of the machine, whereas the said pawl when dropping from the lower edge of the sheet would cause the mechanisms to operate. However, with these mechanism as heretofore constructed it was not possible in every case to at once and before starting to write adjust the sheet of paper in such a manner as to be sure that the lower margin of the sheet would have a certain predetermined width, this being only possible within certain limits, as will be made clear by the following example: Assuming, for instance, that the length of the sheet used when measuring from the first line to the bottom edge of the sheet corresponds to sixty-nine single line-spacings, or, in other words, to the like number of step-by-step rotations of the paper-roller to the extent of one tooth of its ratchet-wheel each time. Assuming, further, that the ratchet-and-pawl feed mechanism of the paper-roller be so adjusted as to cause the latter to feed the sheet of paper forward to the extent of two teeth each time in passing from one line to the other, and that the pawl be so adjusted that its end be eight single line-spacings away from the impression-point—that is to say, from the lowermost edge of the types—in this case the pawl will drop down from the sheet of paper as soon as thirty-one lines have been written, because at the thirtieth line the width of paper from there to its lower edge was still equal to nine (9) single line-spacings—69—(2×30) = 9—so that the pawl could not yet then drop from the sheet of paper. However, after completion of the thirty-first line the distance from the lower edge of the sheet would not be eight but only seven (9-2) line-spacings. A width corresponding to eight line-spacings would, therefore, occur only if, in the example here chosen (line-spacing of two ratchet-teeth each time) the length of the sheet from the first line to the lower edge were such as would correspond to an even number of single line-spacings.

The conditions above explained will appear still more striking when the line-spacing corresponds to a step-by-step rotation of the paper-roller to the extent of three or four teeth of the ratchet-wheel, in which case the distance between the bottom line of writing and the lower edge of the sheet may vary to the extent of two or three single line-spacings.

My invention therefore consists in the construction and combination of parts hereinafter described, whereby the means for effecting and indicating the coöperation of the lower edge of the sheet with a pawl are so combined with a scale or graduation that the latter will enable the operator to at once determine before he begins to write what position the bottom line to be written will have relatively to the lower edge of the sheet and at which point of the sheet the first line will have to be located in order to secure the desired width of lower margin, or, in other words, what position of adjustment must be given to the point of impression, and hence also to the pawl, in order to cause the signal to be sounded or the machine to be rendered inoperative at the time when the last line desired has been written.

Figure 2:
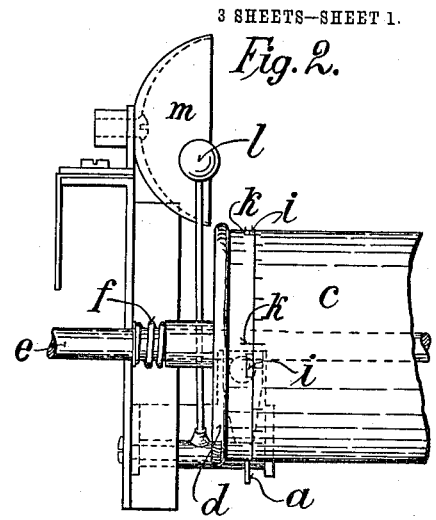
Figure 3:
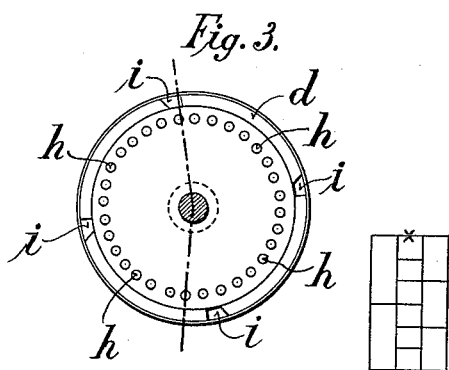
Figure 4:
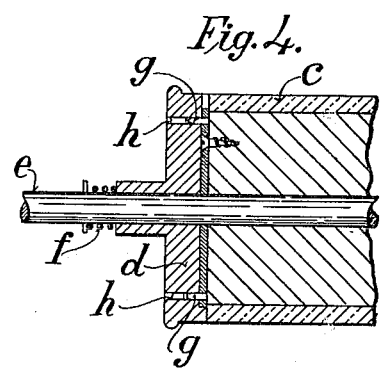
Figure 5:
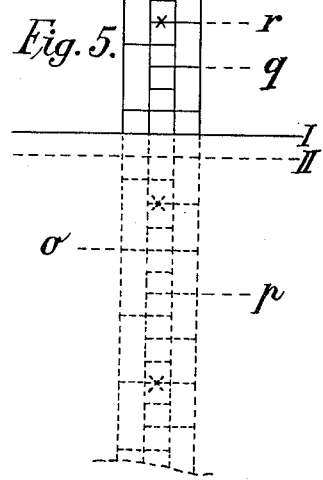

In the drawings, Figure 1 is an end elevation, and Fig. 2 a front elevation, of part of a type-writing machine constructed according to my invention, with certain parts omitted and others partly broken away. Fig. 3 is an end elevation, and Fig. 4 a central vertical section, partly broken away, of the paper-roller. Fig. 5 is a plan view of a scale or graduation, hereinafter to be referred to.

Figure 6:
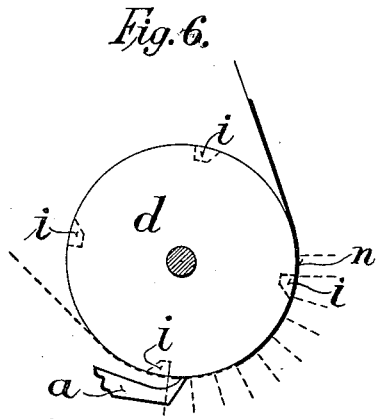
Figure 7:
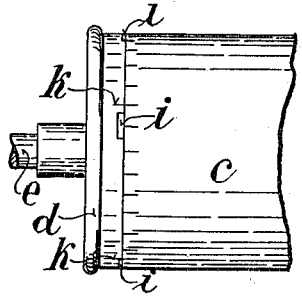
Figure 15:
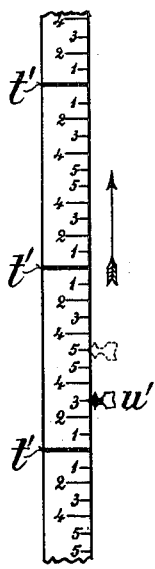
Figure 16:
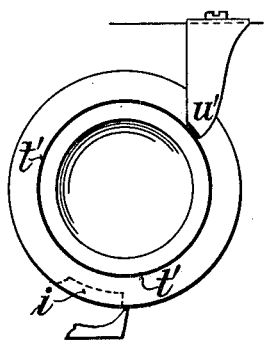
Figure 17:
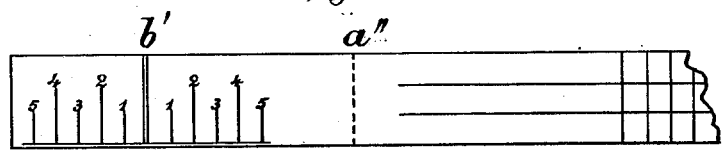

Fig. 6 is a diagram to be referred to. Fig. 7 is a front elevation of the parts shown in section in Fig. 4. Figs. 8 and 9 illustrate a modified construction of the mechanism shown in Figs. 1 and 2, respectively, and shown in a similar manner. Figs. 10, 11, 13, and 14 are diagram or detail views to be more fully explained hereinafter. Fig. 12 is a partly-broken plan view of a scale or graduation to be referred to. Figs. 15 to 17 illustrate other details more or less diagrammatically.

In the construction shown in Figs. 8 and 9 the pawl $a'$ coöperates with an endless circumferential groove $i$, provided near the one end of the paper-roller $c$ and normally covered by the sheet of paper passing over the said roller $c$, the said pawl, which normally rides on the sheet of paper, dropping from the latter into the uncovered portion of the said groove as soon as the lower edge of the paper has passed below the pawl. As here shown, the pawl $a'$ itself is capable of adjustment, being to this end mounted on a part $s$, capable of being oscillated on the axis $e$ of the paper-roller and carrying a pinion $t$. The latter is in engagement with a rack $v$, mounted to slide in suitable guides in the frame of the machine and pressed toward the pinion $t$ by the action of a spring $u$. The said rack is formed with ratchet-teeth adapted to be engaged by a correspondingly-shaped edge $w$ of the machine-frame for thereby enabling the said rack to be secured in any desired position of adjustment. The part $s$, which in addition to the pawl $a'$ carries an alarm-bell $m$, is mounted in close proximity to the paper-roller $c$.

By pressing the rack $v$ backward against the pressure of its spring $u$ it may be disengaged from the edge $w$ and may then be slid upward or downward to thereby adjust the pawl $a'$ in accordance with the number of interstices of the ratchet-teeth on the rack $v$— say eight, as here shown—in a corresponding number of different positions relatively to the point of impression $n$, Fig. 8, these positions having a certain relation to the number and arrangement of the teeth of the ratchet feed-wheel on the paper-roller. This arrangement renders it possible to vary the width of the lower margin on the sheet to the extent of from a single line-spacing to eight line-spacings, as may be desired, it being only necessary to move the pawl $a'$, with its point or end backward, to the extent of that number of teeth which will correspond to the number of single line-spacings which the width the lower margin on the sheet is desired to measure. Thus in the position as shown in Fig. 8 the end of the sheet of paper is located four single line-spacings below the impression-point, and this is then the position in which the sheet will be when the last line is being written. The end or point of the pawl still rests on the sheet of paper; but in the next rotation of the paper-roller to the extent of one ratchet-tooth the pawl will drop into the groove $i$, causing the hammer $l$ to strike the bell $m$, and thereby to sound the alarm. However, in order to actually bring the last line into a position relatively to the lower edge of the sheet corresponding to the width of four single line-spacings the first line to be written must be located at the proper point on the sheet. In order to make the proper adjustment for this case, I employ a scale or graduation such as shown by way of example in Fig. 10 of the drawings. This scale or graduation must be imagined as beginning at the point of impression on the paper-roller, and its continuation extends upwardly from the lower end of the paper-guiding plate of the type-writing machine and along the upper surface of the said guiding-plate—that is to say, toward the lower end of the sheet of paper, this being the end which lies uppermost when the sheet of paper has been placed on the guiding-plate—the scale or graduation terminating on an upper extension of the guiding-plate, which must be sufficiently long to have that end of the sheet which will subsequently be the lower edge of the letter, &c., to be written still come within the scale or graduation when taking into account the largest size of sheets to be accommodated and when adjusting the foremost edge of the sheet at such a distance away from the point of impression as will correspond to the approximate width of the upper margin.

In the arrangement of the scale or graduation as shown in Fig. 10 provision is made for the three most commonly employed line-spacings, (which correspond with one and two and three ratchet-teeth movements for narrow, medium, and wide line-spaces, respectively,) and every sixth line of the respective series of graduation-lines is marked to correspond the one with the other.

The sheet of paper having been introduced into the type-writing machine in the usual and well-known manner and having been fed forward by rotating the paper-roller to such an extent as to bring the point of impression into a position corresponding with the neight at which it is desired to start with the first line to be written, the position of the lower edge of the sheet relatively to the scale or graduation will at once enable the operator to see at which line of the scale or graduation the last line to be written will ultimately be, taking into consideration the feed adjustment provided for at the time being (one, two, or three ratchet-teeth) and the intended width of the lower margin. The operator will then be able to determine whether in this position of the sheet such a number of graduation-lines will remain between that graduation-line which corresponds with the ultimate position of the last line, on the one hand, and the lower edge of the sheet, on the other hand, as would correspond with the desired width of the lower margin intended, and he will then be able to at once so adjust the position of the sheet by rotating the paper-roller forward or backward to the proper extent as to bring the lower edge of the sheet to the desired number of graduation-lines counting from the last line to be written, and this adjustment will then have the result that the desired width of the lower margin will be actually obtained. The rack $v$ is at the outset adjusted by bringing the edge $w$ into engagement with the fourth ratchet-tooth of the said rack counting from the upper end.

In the other form of my invention, as shown in Figs. 1 to 4, the pawl $a$ is mounted in a stationary part of the machine, a spring $b$ acting to press the said pawl toward a metal disk $d$, rotatably mounted for adjustment on and relatively to the paper-roller $c$. As shown in the drawings, the said disk is mounted on the axis $e$ of the paper-roller, and a spring $f$, provided on its axis, tends to keep the said disk in engagement with the end face of the said roller, while two pins $g$, projecting from the latter, normally engage in two openings of an annular group of openings $h$ provided in the said disk $d$, thereby normally securing the latter against rotation relatively to the paper-roller. The disk $d$ on that side which adjoins the paper-roller is formed on its circumference with four recesses $i$ and provided near the latter with marks $k$, indicating the location of the said recesses when these are covered by the paper. Opposite these marks the circumference of the paper-roller has also similar marks or graduation-lines impressed thereon, their number corresponding to the number of ratchet-teeth of the feed-wheel of the paper-roller, (thirty-two, for instance.)

The sheet of paper having been inserted into the machine and being carried over the paper-roller covers the recesses $i$, and thereby prevents the pawl $a$, which during the rotation of the paper-roller rides on the surface of the sheet of paper, from dropping into the recesses, which for the time being are covered by the sheet of paper. As soon, however, as the roller has been rotated to such an extent that a recess located beyond the lower edge of the sheet, and hence not any longer covered by the latter, arrives in position opposite the pawl $a$ the latter will drop into the said recess under the action of the spring $b$. This causes the hammer $l$, connected with the pawl, as shown in Figs. 1 and 2, to sound the alarm-bell $m$, mounted on the machine-frame, thereby indicating to the operator that the last line to be written has been completed and that he must not continue writing any further.

From the above it is clear that if it is desired to locate the last line to be written at a considerable distance away from the lower edge of the sheet, the adjustment of the disk $d$ relatively to the paper-roller or relatively to the pawl $a$ must be made in such a manner as to cause the first recess $i$ which becomes clear of the sheet of paper to be located as near as possible to the lower edge of the sheet, whereas if it is desired to locate the last line of writing nearer the lower edge of the sheet the adjustment must be made in such a manner as to cause the next recess which becomes clear of the sheet of paper to be further removed from the lower edge of the sheet. In order to effect such adjustment of the disk $d$, the operator draws the said disk $d$ away from the paper-roller $c$ against the action of the spring $f$ until the pins $g$ are disengaged from their openings $h$. He then rotates the disk $d$ to a sufficient extent and finally allows the same to be pressed against the paper-roller again by the action of the spring $f$, the pins $g$ engaging two other openings $h$. The extent of the rotation or angular movement to be thus imparted to the disk $d$ in accordance with the desired lower margin between the last line and the lower edge of the sheet is again ascertained by means of a scale or graduation. On this scale or graduation those lines which in regard to their location correspond with the position of the recesses $i$ on the paper-roller (in the example shown every eighth line) are designated by a cross, ($\times$.) Thus if at the time when the operator begins to write one of the recesses $i$ happens to be in the upper position he will be able to see by what number of graduation-lines (or what number of ratchet-teeth of the paper-roller) the next recess following after the lower edge of the sheet will be away from this lower edge. Assuming, for instance, that the lower edge of the sheet be lying on the graduation in the position indicated by the dotted line II in Fig. 5, also that it be intended to provide for a lower margin corresponding to five lines of the graduation and that the paper-feed of the machine be adjusted for a line-spacing of two graduation-lines or ratchet-teeth, then the lines $o$ and $p$ of the scale or graduation shown in Fig. 5 will come into consideration for the last line to be written and the location of the next recess $i$ remaining uncovered will correspond to the graduation-line $r$. Now assuming that the last line will be at $o$, then it will be seen that the lower margin will correspond to only four graduation-lines—that is to say, it will be too narrow. On the other hand, assuming that the last line will be at $p$, the lower margin will measure six graduation-lines—that is to say, it will be too wide. The operator will therefore now shift the sheet of paper to the extent of one line of the scale or graduation, so as to bring its lower edge into the position I, Fig. 5, and the lower margin, assuming the location of the last line to be at the graduation-line $o$, will then measure five graduation-lines. If the operator now counts backward eight lines—that is to say, upward on the scale or graduation beginning at the line $o$, last line to be written—he will arrive at the graduation-line $q$. He will therefore have to adjust the disk $d$ in such a manner as to move the recess $i$ forward to the extent of two teeth, so that the mark $k$ will be two graduation-lines behind the uppermost line or mark on the paper-roller, Fig. 7. Thus in the example referred to the pawl $a$, Fig. 6, will after a certain number of rotary feed movements of the paper-roller drop into one of the recesses $i$ of the disk $d$ at the moment when the lower margin will correspond to a five single line-spacings, and when the sheet of paper will, after completion of the last line to be written, be fed forward again. The sounding of the alarm-bell occurring at this moment will then indicate to the operator that he must not write any further, but that he must now remove the sheet of paper from the machine.

Another modification of my invention is as follows: The arrangement of the pawl $a'$, bell-hammer $l$, and alarm-bell $m$ is the same as shown in Figs. 1 to 4. The disk $d$ is not movable but rigid on the paper-roller. Instead of four recesses $i$ only three such recesses are formed in the disk $d$. Each of these recesses extends over a portion of the circumference of the paper-roller corresponding to three and one-half teeth of its feed-ratchet. The marks which indicate when in their top position that one of the engaging recesses $i$ has arrived in position immediately behind the end or point of the pawl $a'$ are provided on the circumference of the left-hand knob of the paper-roller, as shown in Fig. 11. The graduation-lines on the paper-roller proper are dispensed with. The feed-ratchet has thirty-three teeth. This arrangement enables the operator by means of the scale or graduation to at once so adjust the position of the sheet of paper that its lower margin after completion of the last line to be written will have a certain predetermined relation to the next engaging recess not any longer covered by the sheet of paper. I will illustrate this by an example. The scale or graduation employed in this modified construction, as shown in Fig. 12, has the graduation-lines for the several sizes of margin arranged in groups, one to eight, corresponding to the narrowest line-spacing, two to nine to medium and three to ten to the widest, thus directly indicating the point at which the lower edge of the sheet must be located in the respective group according to the paper-feed adjustment employed in the machine for the time being. Instead of being connected with or formed on the paper-guiding plate of the machine this scale or graduation may also, if desired, be provided in any suitable manner on the base or supporting plate of the machine. In this case the said scale or graduation is provided on its left-hand end portion with a mark $a''$, indicating the location of the point of impression, and also another mark $b'$, which indicates the location of a suitable "guide-line" (for instance, the upper edge of the front paper-guide plates of the "Underwood" typewriter.) On the right and left of the said mark $b'$ a number of graduation-lines (5–6) are provided at distances apart corresponding to those of the single line-spacings. Before inserting the sheet of paper into the machine the operator so places it on the above-described scale or graduation that the left-hand or upper edge of the sheet will be approximately on the guide-line mark $b'$ and that its right-hand lateral edge will lie on the central portion of the scale or graduation, assuming the paper-feed of the machine to have been adjusted for medium-line spaces. The operator then shifts the sheet of paper to the left or right to such an extent as to cause its right-hand or lower edge to lie on that graduation-line of the respective group of lines which indicates the desired width of margin. In the present instance this would be the graduation-line 5 of the central graduation. The operator then ascertains on the left-hand side at which graduation-line on the left or right of the mark $b'$ the left-hand edge of the sheet of paper lies, and he is thus able to determine by what number of single line-spaces the paper, after its insertion into the machine, must with its upper edge be adjusted above or below the guide-line (the latter in the Underwood type-writer corresponding to the upper edge of the lateral paper-guide plates) before rotating the paper-roll to such an extent—without, however, changing the position of the sheet of paper—as to bring the one or other of the marks $t'$ provided on the circumference of the left-hand side knob of the paper-roller, Fig. 11, into its uppermost position. If desired, the paper-roller may also be so adjusted that the mark $t'$ will not be exactly in the uppermost position, but that it will be moved in a direction toward or away from the operator by the same number of ratchet-teeth as that above referred to. To this end the left-hand knob of the paper-roller may in addition to the marks $t'$ be provided on its circumference with a number of separate marks or lines for each position of the paper-roller, these lines or marks being designated as shown in Fig. 15. The scale or graduation thus formed on the said knob will when the latter is rotated be moved relatively to a stationary pointer $u'$, secured on the frame of the paper-slide of the machine. The said knob and the pointer may also, if desired, be arranged, as shown in Fig. 16, so as to be better under the control of the operator. Supposing that the left-hand edge of the sheet of paper when placed on the large scale or graduation shown in Fig. 17 lie at the graduation-line 3 on the left of the mark $b'$, then the operator after having inserted the sheet of paper into the machine will shift it forward until the pointer $u'$ arrives at the third line behind a $t'$ mark, Fig. 15. The upper edge of the sheet of paper must then project beyond the guide-line on the machine and the operator will then draw the sheet of paper back without, however, altering the position of the paper-slide until its upper end arrives in alinement with the guide-line. After the sheet of paper has been brought into the correct position it may be moved forward only by means of the paper-feed lever and backward only by a step-by-step rotation of the paper-roller to the extent of such a number of ratchet-teeth as will correspond with the line-spacing adjustment made for the time being, for instance, to the extent of two ratchet-teeth each time for the medium line-spacing adjustment. When following these directions, the desired lower margin will always be found to have been obtained every time when the alarm-bell sounds.

Figure 13:
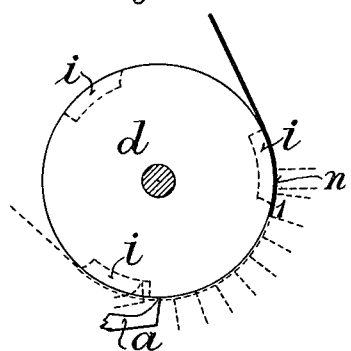

Fig. 13 shows the relative positions of the sheet of paper, point of impression, pawl, and engaging recesses while the last line is being written, and assuming that the paper-feed of the machine has been adjusted for single line-spaces and that a lower margin of the width of a single line only be intended. The position assumed by the pawl upon the paper having been fed forward again after completion of the last line to be written is designated by dotted lines in this figure.

Figure 14:
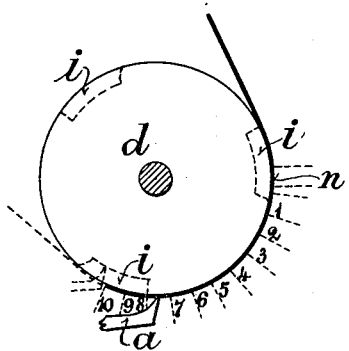

Fig. 14 shows, on the other hand, the relative positions of the sheet of paper, pawl, and engaging recess when the paper-feed has been adjusted for the widest line-spaces (three ratchet-teeth each time) and when it is desired to obtain a width of lower margin corresponding to ten single lines. In this figure the position assumed by the pawl upon the paper having been fed forward again after completion of the last line is also shown in dotted lines.

What I claim as my invention, and desire to secure by Letters Patent, is—

1. In a type-writing machine, the combination with a paper-roller having a circumferential recess or recesses on that part of its surface which is covered by the paper passing over the said roller, of a pawl mounted in the vertical plane of the said recess or recesses and above the surface of the paper passing between said pawl and said recess or recesses, means causing the said pawl to engage the said recess or recesses after the paper is passed below the said pawl, an indicating device, connections between said device and said pawl whereby said device is operated by the engagement of the said pawl with the said recess or recesses, adjusting means for altering the relative positions of the pawl and paper-roller in a rotative sense, means for determining and reading off the extent of such relative adjustment, and a scale or graduation having its lines arranged in a certain relation to the location of the point of impression on the paper-roller and to the position to be given the paper relatively thereto for different line-spacing adjustments of the machine.

2. In a type-writing machine, the combination with a paper-roller having a circumferential recess or recesses on that part of its surface which is covered by the paper passing over the said roller, of a pawl mounted in the vertical plane of the said recess or recesses and above the surface of the paper passing between said pawl and said recess or recesses, means causing the said pawl to engage the said recess or recesses after the paper is passed below the said pawl, an indicating device, connections between said device and said pawl whereby said device is operated by the engagement of the said pawl with the said recess or recesses, adjusting means for altering the relative positions of the pawl and paper-roller in a rotative sense, means for determining and reading off the extent of such relative adjustment, and a scale or graduation on the paper-guiding plate of the machine having its lines arranged in a certain relation to the location of the point of impression on the paper-roller and to the position to be given the paper relatively thereto for different line-spacing adjustments of the machine, substantially as and for the purpose described.

JOSEF FRANZ FORKARTH.

Witnesses:
ABRAHAM SCHLESINGER,
CYAVERY KÖRNER.